United States Patent Office 3,218,287
Patented Nov. 16, 1965

3,218,287
POLYMER SYSTEMS AND METHOD OF
PREPARING THEREOF
Claude J. Schmidle, Easton, Pa., George L. Brown,
Swampscott, Mass., and Robert S. Shaw, Philadelphia,
Pa., assignors to Rohm & Haas Company, Philadelphia,
Pa., a corporation of Delaware
No Drawing. Filed Feb. 24, 1964, Ser. No. 347,042
7 Claims. (Cl. 260—33.6)

This application is a continuation-in-part of the co-pending applications of Schmidle et al. Ser. No. 88,633, filed February 13, 1961, now U.S. Patent 3,166,524, Schmidle et al. Ser. No. 53,377, filed September 1, 1960, now abandoned and Schmidle et al. Ser. No. 758,892, filed September 4, 1958.

This invention is concerned with novel improved polymer compositions and methods of making them.

In accordance with the present invention, novel, advantageous polymer compositions are obtained by polymerization of one or more polymerizable ethylenically unsaturated monomers, preferably containing a single group $H_2C=C<$ imparting polymerizability to the monomer, in an organic solvent in which the polymer obtained is insoluble but is maintained in stable dispersed state by a polymeric dispersing agent soluble in the organic solvent, the addition in liquid condition of a complemental or modifying material such as a film-forming or plasticizing material soluble in, or miscible with, the organic solvent, and then, if desired, removing some or substantially all of the solvent so that the polymer produced becomes dispersed in the form of insoluble particles in the complemental material. The use of the term "complemental" herein is not intended to exclude the addition of other components to the compositions or in any way to imply that the complemental material is always present in the composition in an amount that is less than the amount of dispersed polymer.

The complemental material may be a liquid or a solid at normal room temperature (20° C.). If a liquid, it may be mixed into the polymer dispersion at room temperature, but if a solid, it is first melted before mixing it in and the polymer dispersion is also at a temperature above the melting point of the solid. In the latter instance, a solid composition is obtained after removal of solvent and cooling and the polymer in the composition becomes redispersed on heating the composition to a temperature above the melting point of the complemental material.

The polymer dispersions with which the complemental material is to be compounded may be prepared in any suitable fashion. For example, any of the methods disclosed in copending U.S. applications for Letters Patent, Serial Nos. 758,892, filed September 4, 1958, and 53,377 filed September 1, 1960, and any of the polymer dispersions therein disclosed may be used and the entire disclosures of those two applications are incorporated herein by reference. Those applications disclose the polymerization, in a hydrocarbon solvent medium containing an addition polymerization catalyst, of polymerizable monoethylenically unsaturated monomeric material to produce a dispersed particulate polymeric material insoluble in the medium, the medium containing a dispersing agent or dispersing agent precursor during the polymerization. The dispersing agent may be formed in situ from the precursor in the polymerization medium or it may be formed before it is introduced into the polymerization medium in which the main polymer is to be prepared.

As disclosed in Serial No. 758,892, among the synthetic linear polymers of acrylic type that may be employed as the precursors are the oil-soluble types formed exclusively of monoethylenically unsaturated molecules comprising at least one ester of acrylic acid or methacrylic acid such as copolymers of esters of methacrylic acid or acrylic acid formed with alcohols having 4 to 18 carbon atoms or of mixtures of such esters with esters of methacrylic acid or acrylic acid formed with alcohols having 1 to 5 carbon atoms, wherein sufficient hydrocarbon groups of at least four carbon atoms are present to impart solubility of the precursor in the solvent medium used in the polymerization system. Mixtures of methacrylate and acrylate esters can be used in the production of the solvent-soluble precursors. Such polymeric precursors may also include in the copolymer molecule substantial proportions from 1% to as much as 50% by weight of units derived from other monoethylenically unsaturated monomers such as maleic anhydride, acrylic acid, methacrylic acid, vinyl pyrrolidone, N-dimethylaminoethyl acrylate or methacrylate, N,N-dimethylaminoethyl acrylamide or methacrylamide, dimethylaminoethyl vinyl ether, dimethyl aminoethyl vinyl sulfide, ureidoalkyl vinyl ether or sulfide such as the unreidoethyl vinyl ether or sulfide, vinyl chloride, vinylidene chloride, vinyl acetate, vinyl propionate, vinyl laurate, vinyl stearate, vinyl oleate ethylene, isobutylene, acrylamide, methacrylamide, acrylonitrile, methacrylonitrile, vinyl ethyl ether, vinyl isobutyl ether.

As the precursor for the polymeric dispersing agent, oxidized vegetable oils such as blown linseed oil, blown castor oil, and the like may be employed.

As disclosed in those applications, the use of hydrocarbon solvents for the preparation of the polymer dispersions is particularly advantageous and the hydrocarbons used may be aliphatic (acyclic or alicyclic), aromatic, naphthenic, or mixtures. Examples of individual hydrocarbons that may be employed include pentane, n-hexane, cyclohexane, n-heptane, n-octane, iso-octane, benzene, toluene, xylene (o-, m-, or p-xylene). Commercially-available hydrocarbon mixtures may be employed such as mineral spirits, gasoline, xylene mixtures, terpenes, solvent naphthas of aromatic, aliphatic, or naphthenic character, alkyl benzenes in which the alkyl group or groups have from 1 to 4 carbon atoms, octane fractions which contain a mixture of octane isomers, and so on. Generally, it is preferred to employ a hydrocarbon liquid medium comprising at least 50% by weight of non-aromatic components, and especially those of aliphatic or paraffinic make-up. This preference has the advantage of lower cost and capacity to disperse a wider variety of polymers in the form of discrete particles.

It is essential that the hydrocarbon be of liquid character, but it may have a wide boiling range from a minimum of about −50° C. (in which case high pressures may be needed in the polymerization) to a maximum which may be as high as 300° C. For most purposes, the boiling point should be from about 0° C. up to about 200° C. The boiling point or boiling range of the liquid hydrocarbon system may be chosen as desired to be suitable for the particular operation in which the polymer dispersion prepared in the hydrocarbon is to be used. Thus, in coating or impregnating operations intended to be carried out in low temperature climates, a liquid hydrocarbon medium having a relatively low boiling point such as from about 30° C. to 35° C. may be preferred. A similar boiling point range may be selected for pressure systems, as in aerosol sprays. On the other hand, where the coating and impregnating operation is to be carried out in equipment provided with relatively high temperature drying ovens or rolls, the hydrocarbon system may have extremely high boiling points such as from 275° to 300° C. However, for most purposes, it is preferred to employ liquids boiling in the range from about 50° C. to about 235° C.

It is essential to select the hydrocarbon with the particular polymer to be prepared therein in mind. The hydrocarbon medium should be such that the polymer formed is relatively insoluble therein. This does not preclude the use of a hydrocarbon medium capable of swelling the polymer or of dissolving in the polymer up to 1% or even 50% on the weight of the polymer. A small proportion up to 10% of the polymer prepared may be of low molecular weight and soluble in the hydrocarbon medium. When the polymer prepared in the system has an appreciable solubility within the hydrocarbon medium, that portion which dissolves serves to thicken the system. By employing a composite hydrocarbon medium in which one of the components exerts a solvent action on the polymer and the other is substantially completely inert, controlled viscosity can be obtained merely by adjusting the proportions of the two components of the mixture. For example, a mixture of octane and toluene may be employed for the preparation of a dispersion of a polymer which has complete solubility in toluene and substantially no solubility in octane. By increasing or decreasing the proportion of toluene in the system, the viscosity in the system may be varied as desired from a very high value down to a very low value approaching that of the liquid used for the vehicle. In all of the systems of the present invention, the largest portion of the polymer, at least 90% by weight thereof, remains in undissolved condition dispersed in the system as discrete particles having sizes of 10 microns or less, and preferably from about 0.1 to 2 microns, by a dispersant more particularly described hereinafter.

The nature of the dispersing agent used depends on the solvent medium and the particular polymer dispersed. For the preferred hydrocarbon solvent media, the dispersing agent is of hydrophobic character and contains in its molecule two essentially different portions or components, one of which is preferentially soluble, in, or miscible with, the hydrocarbon medium at least to that degree which would result in the formation of a colloidal solution thereof, which portion may or may not be incompatible with the polymer to be dispersed which may be termed the main or primary polymer in the system. The other component or portion of the polymeric dispersing agent molecule is preferentially soluble in, or miscible with, the main polymer which portion may or may not be incompatible with the hydrocarbon medium. Thus, the first-mentioned portion has a stronger affinity for the hydrocarbon medium than the other, whereas the second-mentioned portion has a stronger affinity for the main polymer. The second-mentioned component of the dispersant may be introduced into the polymeric dispersing agent molecule by a grafting operation wherein there is used a monomer which is of the same chemical constitution, or of sufficiently similar chemical constitution, as that of the monomer or monomers employed in the formation of the main polymer so that the portion of the dispersing agent molecule derived therefrom is compatible or miscible with the main or primary polymer.

The formation of the dispersing agent may be effected in situ simultaneously with the main polymerization. Alternatively, the dispersing agent may be formed by a separate preliminary graft polymerization and then introduced into the main polymerization system. Any of the dispersing agents disclosed in the two copending applications, Serial Numbers 758,892 and 53,377, mentioned hereinabove may be used.

Any dispersed polymer may be used and it may be formed from one or more of a wide variety of monomers, such as the vinyl esters of fatty acids having from 1 to 18 carbon atoms including vinyl acetate, vinyl propionate, vinyl butyrate, vinyl laurate, vinyl oleate, and vinyl stearate and lower alkyl vinyl ethers in which the alkyl group has 1 to 4 carbon atoms, such as the methyl, ethyl, propyl, isopropyl, n-butyl, sec-butyl, isobutyl, and tert-butyl vinyl ethers. Itaconic acid esters, esters of α-cyano-acrylic acid, and esters of acrylic acid or of methacrylic acid with phenol or alcohols having from 1 to 18 carbon atoms may likewise be employed. Examples include methyl acrylate or methacrylate, ethyl acrylate or methacrylate, propyl acrylate or methacrylate, isopropyl acrylate or methacrylate, the various butyl acrylates or methacrylates, cyclohexyl acrylate or methacrylate, benzyl acrylate or methacrylate, phenyl acrylate or methacrylate, n-hexyl, n-octyl, t-octyl, dodecyl, hexadecyl, or octadecyl acrylates or methacrylates. Acrylonitrile, methacrylonitrile, acrylamide, methacrylamide, styrene, α-methyl styrene, vinyl toluenes, acrylic acid, acrylic acid anhydride, methacrylic acid, methacrylic acid anhydride, fumaric acid, crotonic acid, allyl acetate, glycidyl methacrylate, t-butyl-aminoethyl methacrylate, hydroxyalkyl acrylate or methacrylates such as β-hydroxy-ethyl methacrylate, β-hydroxyethyl vinyl ether, β-hydroxyethyl vinyl sulfide, vinyl pyrrolidone, N,N-dimethylaminoethyl methacrylate, ethylene, propylene, p-methoxy-α-methylstyrene, vinylidene cyanide, α-trifluoromethyl-acrylonitrile, N,N-dialkyl-acrylamides, N,N-dialkyl-methacrylamides, vinyl chloride, vinyl fluoride, vinylidene fluoride, hexafluoropropylene, chlorotrifluoroethylene, and tetrafluoroethylene may also be used as the monomers for making the main polymer. Also copolymers of any one or more of the above-mentioned monomers with up to 50 mole percent of maleic anhydride may be used.

A wide variety of complemental materials may be added to the dispersion before removing solvent. The compositions obtained by the addition of the complemental material and subsequent removal of solvent have a wide variety of uses including potting compounds for molding or casting, as coatings, impregnating compositions, and adhesives, as caulking and sealing compositions, or components thereof, as hydraulic transmission fluids, drying lacquers, paints, or enamels, baking enamels, lubricants and sizes for textile materials, such as loose fibers, yarns, or threads for making them more amenable to such textile operations as drawing, twisting, weaving, or knitting, binders for non-woven fabrics and to unify fibrous backings for making tape, impregnants for stabilizing wool against shrinkage on washing, compositions for creaseproofing cellulosic fabrics, as finishes to render textiles, paper, and leather waterproof or water-repellent, to impregnants to improve the hand, softness and resistance to abrasion of fabrics, and to improve wet and dry strengths, of paper, as polishes for shoes, metals, floors, and furniture, as well as many other uses.

The complemental material may be a plasticizer. Since the purpose of the plasticizer is usually to facilitate film formation, and since it is not always necessary to impart flexibility to the copolymer composition when it is inherently tough and flexible, as is often the case, a fugitive or semi-fugitive plasticizer may be preferred rather than a permanent plasticizer. However, permanent plasticizers may be used without the production of films having poor wear-resistance and poor resistance to water since the proportion of plasticizer introduced is relatively small, being not over about 10% by weight of the copolymer solids. Certain plasticizers, such as tributoxyethyl phosphate, serve also as leveling agents.

Examples of fugitive plasticizers include the monoethyl or monomethyl ether of diethylene glycol, isophorone, benzyl alcohol, and 3-methoxybutanol-1. Examples of essentially permanent plasticizers that are suitable include benzyl butyl phthalate, dibutyl phthalate, dimethyl phthalate, triphenyl phosphate, 2-ethyl hexyl benzyl phthalate, dicyclohexyl phthalate, diallyl phthalate, dibenzyl phthalate, butyl cyclohexyl phthalate, mixed benzoic acid and fatty oil acid esters of pentaerythritol, poly(propylene adipate)dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di-2-ethylhexyl ester of hexamethylene diphthalate, di(methylcyclohexyl)phthalate tributoxyethyl phosphate, tributyl phosphate. The particular plasticizer and the amount thereof used are chosen in accordance with the demand for compatibility and efficiency in lowering the film forming temperature.

A polymeric type of plasticizer may also be used such as a polyester or oil-modified polyester formed of a condensation product of a dicarboxylic acid and a polyol. It may be made by condensing a dibasic aliphatic acid having from 4 to 10 carbon atoms with a polyol or a mixture of polyols including mixtures containing at least 25 mole percent of a polyol having three or more hydroxyl groups therein. For example, the polyol may be a diol, such as ethylene glycol, diethylene glycol, propylene glycol, dipropylene glycol, and trimethylene glycol, 1,3-butane-diol, 1,4-butane-diol, and 1,5-pentane-diol. Examples of the polyols containing more than two hydroxyl groups that may be used include glycerine, sorbitol, pentaerythritol, inositol, tetramethylolcyclohexanol, di- and poly-pentaerythritol, and so forth, but trimethylolethane is preferred. Preferably, the proportion of diol is not over 50 mole percent of the entire polyol component and, of course, the diol may be completely absent.

The aliphatic dicarboxylic acid that is used may be adipic acid, succinic acid, glutaric acid, sebacic acid or the like. Preferably it contains from 4 to 8 carbon atoms, but it may contain 9 to 18 carbon atoms.

If desired, there may be used as a part of the dicarboxylic acid component one or more ethylenically unsaturated acids, such as maleic acid, fumaric acid, or the polycarboxylic acid compounds obtained by interacting maleic anhydride with abietic acid, ricinoleic, or eleostearic acids. The unsaturated dicarboxylic acid may amount to 50% of the total dicarboxylic acid used, but is preferably not over 25% of such total.

The polyesters are modified with a higher monobasic aliphatic acid having 8 to 30 carbon atoms, such as a fatty acid or fatty acid mixture derived from drying, semi-drying, or non-drying oils or fats in which the fatty acid has from 12 to 30 carbon atoms and up. The modifying fatty acid may be caprylic acid, pelargonic acid, capric acid, lauric acid, myristic acid, coconut oil fatty acids, palm oil fatty acids, palmitic acid, oleic acid, linoleic acid, stearic acid, linolenic acid, ricinoleic acid, eleostearic acid, or fatty acids obtained by hydrogenation of fish, animal, or vegetable oils or fats. Certain aromatic monobasic acids may replace portions of the aliphatic monobasic acids; for example benzoic acid, toluic acid, or p-tertiary-butyl benzoic acid.

A mixture of a low-molecular weight plasticizer and a high molecular weight or polymeric type of plasticizer may also be used. The proportion of plasticizer added may vary from about 5% or less, based on the weight of dispersed polymer, to as much as about 60% when a low-molecular weight plasticizer is used or about 125% when a polymeric type is used. The resulting compositions have many uses, especially as binders, adhesives, and sealing or caulking compounds, and they may, if desired, contain from ½% up to about 75% by weight of a pigment, based on the weight of dispersed polymer.

Hydrocarbon polymers of low molecular weight which are of viscous liquid character, such as polyisobutylene may be used as the complement as a plasticizer and tackifier for use as adhesives. In this type of composition, the amount of complement may be from 5% to 20% of the weight of dispersed polymer.

Another type of plasticizing complement consists of epoxidized vegetable or animal oils such as epoxidized olive oil, or epoxidized oleic or linoleic acid esters of fatty alcohols having from 1 to 8 carbon atoms or epoxidized mixtures of such esters, such as a mixture of equal parts of each of butyl oleate, isooctyl oleate, and hexyl oleate. The amount of this complement may be from about 3% to 50% based on the total weight of dispersed polymer and complement.

Mixtures of liquid or solid hydrocarbon polymers having mean molecular weights between 300 and 20,000 with the non-aqueous polymer dispersions in the external hydrocarbon phase of which the hydrocarbon polymers are soluble may be prepared in a wide range of proportions. Thus the ratio of soluble polymer to insoluble dispersed polymer may be from about 1:300 to 50:1. When the soluble polymer is predominant, it may be considered that it is modified by the insoluble polymer in the final application whereas the converse holds when the insoluble polymer predominates. The soluble hydrocarbon polymer may be of stable type or it may be polymerizable or hardenable by further reaction by aging, heating, or exposure to ultra-violet light or other types of radiation. These polymers may be homopolymers of ethylene, butylene, isobutylene, isoprene, butadiene, chloroprene, styrene, $\alpha$-methylstyrene, vinyltoluene, cyclopentadiene, and terpenes, such as $\alpha$- or $\beta$-pinene, and copolymers of two or more thereof, such as butadiene-styrene copolymers. The use of the low-molecular weight soluble hydrocarbon polymers serves, in many cases, to improve adhesion, particularly to metals, gloss and pigment-wetting properties. The insoluble polymer also modifies the soluble hydrocarbon polymers in many instances by improving their color, resistance to shrinkage on curing, impact resistance, and durability.

In lubricants or hydraulic transmission fluids, a substantially saturated high-boiling petroleum oil or wax or an animal or vegetable oil, fat or wax may be included. Besides the triglyceride fats and non-drying oils, such as castor oil, olive oil, peanut oil, and rapeseed oil, synthetic esters of a fatty acid with an alkanol, such as methyl stearate, butyl stearate, octyl laurate or, octadecyl stearate may be used. High boiling hydrocarbons and esters or mixtures thereof commonly used in hydraulic transmission fluids may be added. Examples of the ester liquids include fatty acid esters of higher alcohols such as the esters of alcohols from octyl to octadecyl with fatty acids of 1 to 18 or more and preferably 4 to 18 carbon atoms. The ester liquids may also be diesters of aliphatic dicarboxylic acids such as the diesters formed from diacids having from 6 to 12 carbon atoms with monohydric alcohols having from 4 to 12 carbon atoms and preferably 6 to 10 carbon atoms or free mixtures of such alcohols. Examples of the esters that may be involved include di-(isononyl)sebacate, butyl stearate, dodecyl pelargonate, dioctyl sebacate, di-2-ethylhexyl azelate, dioctyl adipate, bis-(2,2,4-trimethylpentyl)sebacate, and so on. The esters may also be polyester condensates (average molecular weight 400 to 800) of glycols, such as ethylene glycol with dicarboxylic acids of 6 to 12 carbon atoms, such as adipic, sebacic, or phthalic acids. Other liquids of ester type include esters of inorganic acids such as phosphates, phosphites, phosphonates, or silicates. Examples include tributyl phosphate, triphenyl phosphate, tricresyl phosphate, tricyclohexyl phosphate, trioctyl phosphate, and the corresponding phosphites or phosphonates, and diethyl silicate, dibutyl silicate, dioctyl silicate. The amount of the complemental material added here varies with the use for which the composition is intended. For a lubricating grease, a fat, wax, or solid ester may be used as the complement in proportions from about 35% to 99.5% of the total weight of the dispersed polymer and complement. If an oil is to be added to form a lubricating grease, the amount added may be from 20% to 40% of the total weight of dispersed polymer and complement. For a transmission fluid, the amount of hydrocarbon oil, ether, or ester added is ordinarily far greater than the amount of dispersed polymer, so that the resulting composition may contain about 0.1 to 10% by weight of the dispersed polymer based on the total weight of the polymer and the complement. In these compositions, the polymer modifies the complement, such as by lowering its pour point, stabilizing it against deterioration with age or on subjection to heat, and preventing deposition of sludge or gum. Similarly, the compositions obtained by using a lubricating or fuel oil as the complement are composed largely of the oil, a small proportion of the dispersed polymer (0.1 to 10%) serving to improve the viscosity characteristic of the lubricating oil or preventing deposition of sludge or gum in either the lubricating oils or on operating surfaces of the engine in the case of fuel oils.

Besides using waxy materials as a complement in forming lubricating greases, this type of complement may also be used in the formation of compositions for polishing shoes, metals, furniture, or floors whether of wood, plastic or asphalt tile, terrazo, or concrete. Petroleum waxes, polyethylene, and natural waxes, such as japan wax, carnauba, beeswax, Chinese insect wax, and myrtle wax, are useful for this purpose, and the amount of wax may vary from 20% to 70% of the weight of dispersed polymer.

The complement may be an epoxy resin, more specifically a di-(vic-epoxide).

Polyepoxides that may be used include glycol-bis-exo-dihydrodicyclopentadienyl ethers having the general formula:

(I)  $O'=C_{10}H_{13}-O-R-O-C_{10}H_{13}=O'$ in which $C_{10}H_{13}$ is the radical of exo-dihydrodicyclopentadiene, the two O′ groups are oxygen atoms which together with two adjacent carbon atoms in the $C_{10}H_{13}$ radicals form oxirane rings, and R is either (a) an alkylene group of 2 to 12 carbon atoms or (b) a radical of an etherified polyalkylene glycol, which radical has the formula $(R'-O-)_xR'$ in which R′ is an alkylene group of 2 to 4 carbon atoms and $x$ is an integer having a value of 1 to 8 inclusive. These compounds and their production are described in U.S. Patent 2,543,419. There may also be used the "ethoxyline resins" available under the trade names of Epon or Araldite resins. They are polyether derivatives of a polyhydric phenol containing epoxy groups and may be prepared by effecting reaction between a polyhydroxy phenol or alcohol, for example, hydroquinone, resorcinol, glycerine, or condensation products of phenols with ketones, for instance, bis-(4-dihydroxydiphenyl)-2,2-propane, and epichlorohydrin. For example, the reaction of epichlorohydrin with bis-(4-hydroxyphenyl)-2,2-propane may be formulated as follows:

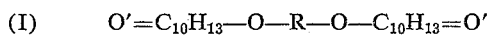

(II)

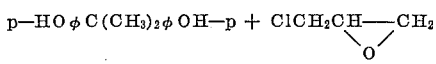

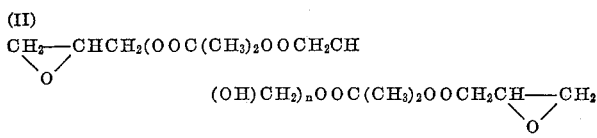

where $\phi$ is the phenylene group and $n$ has an average value varying from around zero to about 7. These resins may be made by the method disclosed in 2,324,483, 2,444,333, British Patents 518,057 and 579,698. Many of these ethoxyline resins are sold under the name of Epon resins by Shell Chemical Corporation or Araldite resins by the Ciba Company. Data on the Epon resins are given in the table below:

TABLE I

| Epon No. | Epoxide Equivalent | Approximate Esterification Equivalent | M.P., 0° C. |
|---|---|---|---|
| RN-34 | 225-290 | 105 | 20-28 |
| RN-48 | 192 | 80 | 9 |
| 1064 | 300-375 | 105 | 40-45 |
| 1062 | 140-165 | | Liquid |
| 1004 | 905-985 | 175 | 97-103 |
| 1007 | 1,600-1,900 | 190 | 127-133 |
| 1009 | 2,400-4,000 | 200 | 145-155 |
| 1001 | 450-525 | 130 | 64-76 |

Also, there may be used polyepoxides of the formula (III)  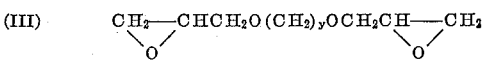

where $y$ is a number having an average value of 2 to 4. Epon 562 is of this type, is liquid at normal room conditions, and has an "epoxide equivalent" value of 140-165. Also, a diepoxide or triepoxide of glycerol may be used. These aliphatic polyepoxides may be prepared in the known fashion as described, for example in U.S. Patent 2,730,427 or 2,752,269. The preferred polyepoxides are those having average molecular weights of about 250 to 1000.

The liquid diepoxides are particularly advantageous. The amount of resin-forming diepoxide may be from 2% to 80% of the weight of dispersed polymer and complement. These compositions may also be provided with a catalyst for accelerating the cure or insolubilization of the polyepoxide. Examples include acids and polyamines, such as ethylenediamine. Such compositions may be applied as coatings or impregnants or they may be cast or molded and then set or cured by heating.

Instead of epoxy resins, the complement may be a phenoplast by which is meant a condensation product of an aldehyde, especially formaldehyde with phenol or p-phenylphenol, p-benzylphenol, or a p-($C_1$–$C_8$)alkylphenol in an amount from about 3% to 50% by weight based on the weight of dispersed polymer and phenoplast. The alkylation is preferably that resulting from an alcohol having from 3 to 6 carbon atoms, such as isopropanol, n-propanol, butanol, pentanol, hexanol, or cyclohexanol. These compositions may be provided with an acidic catalyst for accelerating the cure of the phenoplast. Like the epoxy resin-containing compositions, these are useful as coating, impregnating, molding or casting compositions, especially for the treatment of paper, leather, and textiles.

The complement may be an aminoplast, namely, an organic-soluble alkylated methylolated aminoplast resin including the condensates of formaldehyde with urea, melamine, thiourea, benzoguanamine, ethyleneurea, alkylated with an alcohol having 2 to 6 carbon atoms such as n-butanol. The urea, melamine, or other nitrogenous compuond may contain from 2 to 6 methylol groups of which at least one and preferably at least 2 are alkylated; if desired, the entire content of methylol groups may be alkylated.

Instead of the resin-forming materials just mentioned, the complement may comprise or consist of natural gums or resins, particularly copal, run copal, shellac, amber, colophony, dammer, guaiacum, and sandarac; also alkyd resins having molecular weights of 8000 to 15,000, and linear addition polymers of vinyl chloride, vinyl acetate, ethyl acrylate, and so on. The relative proportions of the dispersed polymer and complement may range from 99:1 to 1:99.

The complement may be an asphalt, pitch, or bitumen in an amount from 3% to 99% by weight, based on the total weight of the dispersed polymer and complement. The resulting compositions are particularly useful as adhesive and sealing or caulking compounds and as impregnants to waterproof textiles, paper, wood, and so on. They are useful in laminating paper and metal foil to make roofing papers or sheets and vapor-sealing building papers or sheets. They are also useful in making asphalt shingles for roofing and siding, asphalt tiles for wall and floor coverings, and felt-base floor coverings.

After the complemental material is added to the non-aqueous polymer dispersion, part or all of the solvent may be removed by heating to evaporate it.

Substantially all of the solvent may thus be removed but the removal of all of the solvent is not essential to produce the novel and advantageous compositions of the type involved in the present invention wherein the polymer is dispersed in a non-volatile component of the composition which non-volatile component is, or is converted into, a permanent part of the coating, impregnant, or otherwise formed articles derived from the composition. Characteristically, the complement makes up the predominating proportion of the total of the solvent and the complement. In general, the compositions obtained in accordance with the present invention contain not over 25% by weight of volatile solvent, (excluding volatile monomer added as a complemental material), based on total weight of dispersed polymer, complemental material, and residual solvent (excluding monomer), when the dispersed polymer is not over 45% by weight of the aforesaid total, and for most compositions the residual solvent (excluding monomer) does not exceed 10% by weight of the total, and ordinarily is less than 3% on this basis.

Before or after the solvent has been evaporated off to the desired extent, the composition may be further modified by the inclusion of dyes, delustrants, fillers, pigments, cure-accelerators, mold release agents, bactericides, fungicides, insecticides, thickening agents, etc.

After application of the compositions for coating, impregnating, molding, or other related purposes, it may be subjected to heat to assist in the setting or curing of complemental materials and/or of the dispersed polymer if it happens to be of reactive type. The heating may be from about 80° C. to 350° C., but should not be so intense or prolonged as to damage any substrates coated or impregnated, such as paper, textiles, or leather. The time of heating may be several minutes, such as 2 to 5 or 10 minutes at the upper limit of the temperature given to a half hour or more at the lower limit.

The typical composition of the present invention is a dispersion of the particles of polymer (obtained from the initial dispersion thereof in a volatile organic solvent) in the complemental material. By the method of the present invention it is possible to obtain compositions containing a much wider range of proportions of polymer in any particular complemental material than can be obtained by the use of organic solvent solutions of the polymer and complemental material. Less difficulty with high viscosity is also encountered with these novel dispersions even though the compositions have only a low proportion of volatile organic solvent at the most. Also, certain of these systems are capable of producing good moldings and castings because of the fact that they can be made substantially free of volatile solvent.

The following examples are illustrative of the invention, the parts and percentages being by weight unless otherwise indicated:

*Example I*

In a suitable vessel were placed 800 parts of a linseed oil modified glycerol/adipic acid polyester condensate having an average molecular weight of about 15,000 and 3070 parts of a non-aqueous dispersion of a copolymer of methyl methacrylates and ethyl acrylate insoluble in the medium (prepared according to Example 4 of copending application, Serial No. 53,377). The mixture was coated on glass and metal plates and baked for 30 minutes at 300° F. producing a clear, tough coherent film without added drier. With a trace of added drier this material was used as a clear coating for California redwood. The coating had good resistance to weathering.

*Example II*

In a suitable vessel were placed 2000 parts of a 50% solution in a 50:50 mixture of n-butanol and xylene of a butylated hexamethylol melamine and 1720 parts of a non-aqueous dispersion of a copolymer of methyl methacrylate and ethyl acrylate insoluble in the medium (prepared according to Example 8 of Serial No. 758,892 and having about 35% solids). A white enamel was prepared in the following manner: 320 parts of rutile titanium dioxide and 400 parts of the mixture of aminoplast and copolymer dispersion were ground on a roller mill until a smooth pigmented paste was obtained. Then this was mixed with 1000 parts of the mixture of aminoplast and copolymer dispersion to which had been added 1.0 part of a 6% solution of monosalt of maleic acid with ethyl amine. The viscosity of the enamel could be lowered by the addition of mineral spirits, however, it was very satisfactory as made and gave a very glossy and well-adhered coating on wood after drying and curing by heating at 140° F. for an hour.

*Example III*

In a suitable vessel, equipped for vacuum distillation, were placed 500 parts of a liquid polyester condensate of sebacic acid and glycol having an average molecular weight of about 800 and 642.0 parts of a non-aqueous dispersion of a copolymer of methyl methacrylate and ethyl acrylate insoluble in the medium prepared according to Example 8 of Serial No. 758,892, except that the monomers used consisted of a mixture of 85% ethyl acrylate and 15% methyl methacrylate. The mixture was heated with stirring and vacuum applied until sufficient solvent had been removed to give a product which was 75.5% non-volatile.

93 parts of this material was mixed with 5 parts of Prussian blue and 5 parts of carbon black and used for the preparation of the second and the final finishing varnish or japan coat for patent leather. Very smooth finishes with no cracking were obtained after the final stoving.

Another portion of the 75.5% non-volatile dispersion was subjected to vacuum until the product was reduced to 98.5% non-volatile. This material was applied in the same way and produced similar results.

*Example IV*

(a) In a suitable vessel, equipped for vacuum distillation, were placed 750 parts of a tung oil-modified adipic acid, ethylene glycol and glycerol polyester having an average molecular weight of 900, 250 parts of dehydrated castor oil, and 1470 parts of a non-aqueous dispersion of a copolymer of methyl methacrylate, ethyl acrylate, and 2-ethylhexyl acrylate (prepared according to Example 11 of Serial No. 758,892).

(b) The material obtained in part (a) was used directly in making a varnish by mixing 3 parts thereof with one part of a soluble p-amylphenol-formaldehyde resin, diluting with 2 parts of mineral spirits.

(c) A varnish was made by mixing 2 parts of the dispersion obtained in part (a) with 1 part of a natural medium-hard copal resin and 2 parts of mineral spirits.

*Example V*

(a) In a suitable vessel, equipped for vacuum distillation, were placed 500 parts of refined castor oil, 25 parts of soyabean oil-modified adipic acid/ethylene glycol/ trimethylolethane polyester condensate, and 642.0 parts of a non-aqueous dispersion of a copolymer of methyl methacrylate and ethyl acrylate insoluble in the medium (preparing according to Example 4 of Serial No. 53,377), except that the monomers used consisted of 65% ethyl acrylate, 30% methyl methacrylate and 5% 2-hydroxyethoxyethyl acrylate). The mixture was heated with stirring and vacuum applied until all of the aliphatic solvent had been removed. This material (146 parts) was reacted with 260 parts of toluene diisocyanate at a temperature of 80° C. for 45 minutes to prepare a prepolymer, which was then mixed with 18 parts of water, 9 parts of triethylamine, 2 parts of triethanolamine and 12 parts of an ethylene oxide condensate of glycerol trioleate containing about 20 oxyethylene groups, to give a rigid polyurethane foam with greatly improved impact strength when compared with a foam prepared from an unmodified castor oil prepolymer.

(b) The prepolymer prepared in part (a) was also blended with an equal weight of castor oil to make a solvent-resistant enamel for coating electrical wires.

Example VI

In a vessel, suitable for vacuum distillation, containing an agitator and thermometer were placed 100 parts of a 50% solution of a copolymer of 90% vinylidene chloride, 9% of methyl acrylate, and 1% of itaconic acid, 3500 parts of a liquid partially epoxidized (about 80% of theoretical) castor oil and 6040 parts of a non-aqueous dispersion of a copolymer of methyl methacrylate and ethyl acrylate insoluble in the medium (prepared according to Example 2 of Serial No. 53,377). The mixture was heated with agitation under vacuum until all of the aliphatic solvent was removed. This gave a viscous paste which was applied to glass and metal. When coated pieces were heated to 350° F. for 3–5 minutes the coating underwent fusion. When cooled a clear, dry, firm film was obtained which was strippable. A portion of the viscous paste was worked on a hot (350° F.) rubber mill to give large sheets of strong, clear film.

Example VII

In a suitable vessel, equipped for vacuum distillation, were placed 3000 parts of asphalt (melting point 180° F.) and this was heated to 212° F. to give a very fluid state. Then 2500 parts of a non-aqueous dispersion of a copolymer of 60% methyl methacrylate and 40% n-butyl methacrylate insoluble in the medium (prepared according to the procedure of Example 2 of Serial No. 53,377 and having 40% solids) was heated to 200° F. and added to the hot asphalt with stirring. The mixture was further heated with stirring and vacuum applied until 1500 parts of aliphatic hydrocarbon had been removed. The finished material was still very fluid while hot, but became hard in much the same way as unmodified asphalt on cooling. However, the material modified according to the above procedure had superior flexural and impact strength to unmodified asphalt. In addition it also had improved resistance to flow at 500° F. when compared to unmodified asphalt.

Example VIII

Into a suitable vessel, equipped for vacuum distillation were placed 600 parts of an alkyd resin (100% solids) prepared from 484 parts of dehydrated castor oil, 50 parts of glycerol, 55 parts pentaerythritol and 180 parts of phthalic anhydride, together with 1000 parts of a non-aqueous dispersion terpolymer of 50% methyl methacrylate, 45% ethyl acrylate and 5% methacrylamide insoluble in the medium (prepared according to the procedure used in Example 8 of Ser. No. 53,377 and having 40.0% solids). The mixture was heated with stirring and vacuum applied until 270 parts of aliphatic hydrocarbon had been removed. This gave a fluid milky white dispersion of 75% solids which gave films of good clarity and superior flexibility and adhesion when roller-coated on cold rolled steel or aluminum and heated at 350° F. for 20 minutes.

Example IX (a) In a suitable vessel, equipped for vacuum distillation, were placed 1000 parts of a liquid polyepoxide having the Formula III (Epon 562) and 2000 parts of non-aqueous dispersion of a terpolymer of 60% methyl methacrylate, 30% ethyl acrylate and 10% acrylonitrile (prepared according to Ser. No. 53,377 procedure of Example 2 and having 50% solids). The mixture was heated with stirring and vacuum applied until all of the aliphatic hydrocarbon had been removed. On cooling to room temperature the finished product was a fluid milky-white dispersion of 50% solid polymer dispersed in the polyepoxide. One-half part of triethylamine fluoborate was dissolved in fifty parts of the dispersion and the mixture was coated on steel panels, dried and heated at 80° C. The material set to a tough, opaque solid adherent film which had good impact resistance.

(b) Part (a) hereof was repeated except that 300 parts of a 50% solution in 50:50 n-butanol/xylene of a butylated urea-formaldehyde condensate was added to the dispersion obtained after removing the solvent.

Example X

Into a suitable vessel, equipped for vacuum distillation, were placed 500 parts of butyl 8,9 epoxyoleate and 1000 parts of a non-aqueous dispersion of a copolymer of 60% methyl methacrylate and 40% ethyl acrylate insoluble in the medium (prepared according to the procedure described in Example 4 of Ser. No. 53,377). The mixture was heated with stirring and vacuum applied until all of the aliphatic hydrocarbon had been removed. On cooling to room temperature the material was an extremely fluid milky white dispersion containing 50% solid polymer in a monomeric plasticizer. This material was used in the plasticization of polyvinyl chloride (20% actual plasticizer) to give a plasticized material with improved surface hardness and flexural strength.

Example XI

In a suitable vessel, equipped for vacuum distillation were placed 1300 parts of a low viscosity (15 poises at 25° C.) epoxidized butadiene polymer having an epoxy equivalent of 232 and 1625 parts of a non-aqueous dispersion terpolymer of 40% ethyl acrylate, 32% methyl methacrylate and 28% acrylic acid (prepared according to the procedure of Example 5 of Ser. No. 53,377 and having 40% solids). The mixture was heated gently with stirring and high vacuum (<1 mm. Hg) applied until all of the aliphatic hydrocarbon had been removed. The finished material was a viscous milky dispersion which gave clear crosslinked films when coated and baked at 350° F. for 15 minutes on cold rolled steel.

Example XII

A methyl methacrylate/ethyl acrylate 50/50 copolymer dispersion (37.3% solids) in mineral spirits was prepared by the procedure described in Example 1 of Serial No. 758,892. Ten percent (based on copolymer solids) of a 60% solution in mineral spirits of a liquid polymer (obtained by heating with 0.5% maleic anhydride at 440° F. for 3 hours a liquid styrene-butadiene copolymer having a molecular weight of about 9,000, an iodine number of about 300, and a viscosity of about 3300 poises at 20° C.) was added. The resulting blend was compatible and gave films of good clarity and adhesion to metal.

Example XIII

A pigment dispersion of 300 parts of titanium dioxide pigment was prepared with 125 parts of the same 60% liquid polymer solution (in mineral spirits) as was used in the preceding example and 290 parts of mineral spirits. Then 600 parts of a 50% solids methyl methacrylate/ethyl acrylate copolymer (50/50) dispersion in mineral spirits (prepared by Example 1 of Serial No. 758,892) was added. The resulting pigmented dispersion, which contained 20% of the liquid polymer (based on total polymer solids) had higher gloss and air-dry adhesion than a similar pigmented dispersion prepared in the absence of the liquid polymer.

Example XIV

One hundred eleven parts of a 1/1 ethyl acrylate-methyl methacrylate polymer dispersion in mineral spirits containing 49% solids and prepared by Example 1 of Serial No. 758,892 was mixed with one hundred parts of Butarez (a polymerizable liquid polybutadiene of about 3500 molecular weight and an iodine number of about 375). The mineral spirits was removed by distillation to give a pale yellow dispersion. One part of this dispersion was mixed with 0.01 part of cobalt naphthenate and cast as a film. Upon drying overnight a tack-free, flexible film was obtained.

Example XV

Twenty parts of a mineral spirits dispersed polymer containing 49.75% ethyl acrylate, 49.75% methyl methacrylate and 0.5% acrylic acid, prepared as described in Example 3 of Serial No. 53,377, was mixed with 10 parts of ethyl hydropolymer oil (a low molecular weight—about 300—polymer of ethylene consisting mainly of cyclic polyolefinic hydrocarbon radicals and having an iodine number of about 450). The mineral spirits was removed by distillation to give a brown-colored fluid dispersion. A steel panel was coated with the resulting dispersion. Upon drying at 100° C. overnight a tack-free, flexible film was obtained. A sample of the hydropolymer oil by itself dried to a brittle film under the same conditions.

Example XVI

One hundred thirty-four parts of Buton A–500 (a styrene-butadiene copolymer having a viscosity of about 4300 poises at 20° C.) and one hundred parts of 2/1 ethyl acrylate/methyl methacrylate copolymer dispersion (50% solids) in mineral spirits, prepared as described in Example 1 of Serial No. 758,892, were mixed. The mineral spirits was removed by evaporation yielding a bluish-white, viscous dispersion. One part of this dispersion was mixed with 0.01 part of cobalt naphthenate and cast as a film. Upon drying overnight at room temperature, a flexible, tack-free film was obtained.

Example XVII

One hundred thirty parts of Buton 100 (a styrene-butadiene copolymer of about 9000 mol. wt., iodine number of 300, and viscosity of about 3300 poises at 20° C.) and 260 parts of a 1/1 methyl methacrylate/ethyl acrylate copolymer dispersion (prepared as described in Example 1 of Serial No. 53,377) in mineral spirits (49.5% solids) were mixed. The mineral spirits was removed by distillation to give a bluish-white, viscous dispersion. One part of this dispersion was mixed with 0.01 part of cobalt naphthenate and cast as a film. Upon drying a hard, flexible film was obtained.

Example XVIII

One hundred thirty parts of Buton A–500 and 260 parts of a 1/1 methyl methacrylate/ethyl acrylate copolymer dispersion in mineral spirits (49.5% solids and prepared as in Example C) were mixed. The mineral spirits was removed by distillation to give a bluish-white, viscous dispersion. One part of this dispersion was mixed with 0.01 part of cobalt naphthenate and cast as a film. Upon drying, a hard, flexible film was obtained.

Example XIX

A mixture of 5 parts vinyltoluene and 5 parts of Buton A–500 was added to 10 parts of the dispersion obtained in the preceding example. A stable dispersion resulted. The resulting product was polymerized by heating to 150° C. after adding 0.1 part of di-t-butylperoxide and casting the dispersion as a film on a steel plate.

We claim:

1. As a composition of matter, an anhydrous dispersion consisting essentially of (A) a material selected from the group consisting of polyester condensation products of a dibasic aliphatic acid having 4 to 10 carbon atoms with at least one polyol selected from the group consisting of ethylene glycol, diethylene glycol, propylene glycol, dipropylene glycol, trimethylene glycol, trimethylolethane, 1,3-butane-diol, 1,4-butane-diol, 1,5-pentanediol, glycerine, sorbitol, pentaerythritol, inositol, tetramethylolcyclohexanol, di- and poly-pentaerythritol, and said polyesters modified with a monobasic aliphatic acid having 8 to 30 carbon atoms and (B) a dispersed particulate polymeric material obtained by the polymerization of monomeric material consisting essentially of monoethylenically unsaturated molecules in an anhydrous solution consisting essentially of (1) a volatile liquid hydrocarbon solvent and, dissolved therein, (2) polymeric material consisting essentially of a hydrocarbon-soluble polymer selected from the group consisting of oil-soluble polymers of at least one ester of an acid selected from the group consisting of acrylic acid and methacrylic acid with alcohols having 1 to 18 carbon atoms having sufficient hydrocarbon groups of at least 4 carbon atoms to impart oil-solubility of the ester polymers, and (3) about 0.1 to 5% by weight, based on the weight of the dissolved polymer (2), of an addition polymerization catalyst, there being in said monomeric material at least one monomer selected from the group consisting of vinyl esters of a fatty acid having 1 to 18 carbon atoms, esters of acrylic acid with an alcohol having 1 to 18 carbon atoms, esters of methacrylic acid with an alcohol having 1 to 18 carbon atoms, phenyl acrylate, phenyl methacrylate, acrylonitrile, methacrylonitrile, acrylamide, methacrylamide, styrene, $\alpha$-methyl styrene, vinyl toluenes, acrylic acid, acrylic acid anhydride, methacrylic acid, methacrylic acid anhydride, maleic anhydride, fumaric acid, crotonic acid, allyl acetate, glycidyl methacrylate, t-butylaminoethyl methacrylate, hydroxyalkyl acrylates, hydroxyalkyl methacrylates, $\beta$-hydroxyethyl vinyl ether, $\beta$-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, tetrafluoroethylene, lower alkyl vinyl ethers in which the alkyl group has 1 to 4 carbon atoms, p-methoxy-$\alpha$-methylstyrene, vinylidene cyanide, esters of $\alpha$-cyano-acrylic acid, $\alpha$-trifluoromethacrylonitrile, N,N-dialkyl-acrylamides, N,N-dialkylmethacrylamides, and itaconic acid esters, the proportion of material (A) supra being about 5% to 125% by weight, based on the weight of the polymeric material of (B) supra, and the dispersed discrete particles of the polymeric material (B) having sizes essentially entirely in the range of 0.1 to 10 microns inclusive.

2. A composition as defined in claim 1 in which the relative proportions between (A) and (B) and any residual hydrocarbon solvent are: at least 30% of (A), up to 45% of (B) and not over 25% of hydrocarbon solvent these percentages being based on the total weight of (A), (B), and hydrocarbon solvent.

3. A composition as defined in claim 1 in which the particulate polymeric material (B) is dispersed in the material (A) and the relative proportions between (A) and (B) and any residual hydrocarbon solvent are: at least 45% of (A), up to 45% of (B) and not over 10% of hydrocarbon solvent, these percentages being based on the total weight of (A), (B), and hydrocarbon solvent.

4. A composition as defined in claim 1 in which the particulate polymeric material (B) is dispersed in the material (A) and the relative proportions between (A) and (B) and any residual hydrocarbon solvent are: at least 52% of (A), up to 45% of (B) and not over 3% of hydrocarbon solvent, these percentages being based on the total weight of (A), (B), and hydrocarbon solvent.

5. As a composition of matter, an anhydrous dispersion consisting essentially of (A) a material selected from the group consisting of polyester condensation products of a dibasic aliphatic acid having 4 to 10 carbon atoms with at least one polyol selected from the group consisting of ethylene glycol, diethylene glycol, propylene glycol, dipropylene glycol, trimethylene glycol, trimethylolethane, 1,3-butane diol, 1,4-butane-diol, 1,5-pentanediol, glycerine, sorbitol, pentaerythritol, inositol, tetramethylolcyclohexanol, di- and poly-pentaerythritol and said polyesters modified with a monobasic aliphatic acid having 8 to 30 carbon atoms, and (B) a dispersed particulate polymeric material obtained by the polymerization of at least one ester of an acid selected from the group consisting of acrylic and methacrylic acids with a saturated aliphatic alcohol having 1 to 18 carbon atoms in an anhydrous medium consisting essentially of (1) volatile liquid hydrocarbon solvent and, dissolved therein, (2) polymeric material consisting essentially of a hydrocarbon-soluble polymer selected from the group consisting of oil-soluble polymers of at least one ester of an acid selected from the group consisting of acrylic acid and methacrylic acid with alcohols having 1 to 18 carbon atoms having sufficient hydrocarbon groups of at least 4 carbon atoms to impart oil-solubility to the ester polymers, and (3) about 0.1 to 5% by weight, based on the weight of the dissolved polymer (2), of an addition polymerization catalyst, the proportion of material (A) supra being about 5% to 125% by weight, based on the weight of the polymeric material of (B) supra, and the dispersed discrete particles of the polymeric material (B) having sizes essentially entirely in the range of 0.1 to 10 microns inclusive.

6. A composition as defined in claim 5 in which the relative proportions between (A) and (B) and any residual hydrocarbon solvent are: at least 30% of (A), up to 45% of (B) and not over 25% of hydrocarbon solvent, these percentages being based on the total weight of (A), (B), and hydrocarbon solvent.

7. A composition as defined in claim 5 in which the particulate polymeric material (B) is dispersed in the material (A) and the relative proportions between (A) and (B) and any residual hydrocarbon solvent are: at least 45% of (A), up to 45% of (B) and not over 10% of hydrocarbon solvent, these percentages being based on the total weight of (A), (B), and hydrocarbon solvent.

References Cited by the Examiner

UNITED STATES PATENTS

| 2,902,463 | 9/1959 | Johnston et al. | 260—873 |
| 2,964,492 | 12/1960 | Murdock et al. | 260—33.6 |
| 3,095,388 | 6/1963 | Osmond et al. | 260—33.6 |

MORRIS LIEBMAN, *Primary Examiner.*

ALEXANDER H. BRODMERKEL, *Examiner.*

UNITED STATES PATENT OFFICE
CERTIFICATE OF CORRECTION

Patent No. 3,218,287 November 16, 19

Claude J. Schmidle et al.

It is certified that error appears in the above identified patent and that said Letters Patent are hereby corrected as shown below:

Column 13, line 45, "C" should read -- XVII --.

Signed and sealed this 24th day of March 1970.

(SEAL)
Attest:

Edward M. Fletcher, Jr.
Attesting Officer

WILLIAM E. SCHUYLER, JR.
Commissioner of Patents